US008849550B2

(12) United States Patent
Larsson et al.

(10) Patent No.: US 8,849,550 B2
(45) Date of Patent: Sep. 30, 2014

(54) METHOD FOR CONTROLLING AN EXHAUST GAS TEMPERATURE

(75) Inventors: Per Larsson, Billdal (SE); Christer Alm, Göteborg (SE); Hans Bernler, Mölndal (SE)

(73) Assignee: Volvo Lastvagnar AB, Göteborg (SE)

( * ) Notice: Subject to any disclaimer, the term of this patent is extended or adjusted under 35 U.S.C. 154(b) by 262 days.

(21) Appl. No.: 13/256,999

(22) PCT Filed: Mar. 24, 2009

(86) PCT No.: PCT/SE2009/000154
§ 371 (c)(1),
(2), (4) Date: Nov. 4, 2011

(87) PCT Pub. No.: WO2010/110700
PCT Pub. Date: Sep. 30, 2010

(65) Prior Publication Data
US 2012/0059572 A1 Mar. 8, 2012

(51) Int. Cl.
F02D 17/04 (2006.01)
F02M 25/07 (2006.01)
F02D 41/02 (2006.01)
F02D 41/12 (2006.01)
F02D 41/00 (2006.01)
F02D 17/00 (2006.01)

(52) U.S. Cl.
CPC ........ F02M 25/0707 (2013.01); F02D 2250/18 (2013.01); F02D 41/0245 (2013.01); F02D 41/123 (2013.01); F02D 41/0055 (2013.01); Y02T 10/26 (2013.01); Y02T 10/47 (2013.01); F02M 25/0727 (2013.01)
USPC .................................. 701/112; 123/198 DB

(58) Field of Classification Search
USPC ............. 701/84, 108, 110, 112; 123/198 DB, 123/320–322, 325, 332; 60/274, 284, 299, 60/278, 301
See application file for complete search history.

(56) References Cited

U.S. PATENT DOCUMENTS

| 5,094,206 | A | 3/1992 | Buslepp et al. |
| 6,032,753 | A * | 3/2000 | Yamazaki et al. ....... 180/65.235 |
| 2003/0178002 | A1 | 9/2003 | Israel et al. |
| 2008/0010987 | A1 | 1/2008 | Benz et al. |
| 2008/0196388 | A1 | 8/2008 | Johnson et al. |

FOREIGN PATENT DOCUMENTS

| JP | 11210507 A | 8/1999 |
| JP | 2001221093 A | 8/2001 |
| WO | 03046354 A1 | 6/2003 |
| WO | 2007032714 A1 | 3/2007 |
| WO | 200815406 A1 | 7/2007 |

OTHER PUBLICATIONS

JP 2001221093 A. Nissan Diesel Motor Co Ltd. Aug. 17, 2001: (abstract)Retrieved from PAJ database; Original document: paragraph (0002).

(Continued)

Primary Examiner — Mahmoud Gimie
(74) Attorney, Agent, or Firm — WRB-IP LLP

(57) ABSTRACT

A method is provided for controlling an exhaust gas temperature of an engine of a vehicle during interruption of fuel supply to the engine, wherein the engine drives a driveline of the vehicle. The method involves alternating between two or more operational modes, wherein at least one of the operational modes maintains a higher exhaust temperature than the one or more other operational modes.

5 Claims, 4 Drawing Sheets

(56) References Cited

OTHER PUBLICATIONS

JP 11210507 A, Nissan Motor Co Ltd, Aug. 3, 1999: (abstract)Retrieved from: PAJ database.

International Search Report for corresponding International Application PCT/SE2009/000154.
International Preliminary Report on Patentability for corresponding International Application PCT/SE2009/000154.

* cited by examiner

METHOD FOR CONTROLLING AN EXHAUST GAS TEMPERATURE

BACKGROUND AND SUMMARY

The invention relates to a method for controlling an exhaust gas temperature, particularly in a commercial vehicle comprising a diesel engine.

The future legislation for heavy duty diesel engines requires an exhaust gas aftertreatment system for emission reduction. Both particulate filters and NOx reduction Systems needs elevated exhaust gas temperatures of about 250° C. to 350° C. for providing a reasonable efficiency in NOX conversion and soot removal, respectively. The exhaust gas temperature during motoring and light engine braking are so low that NOx reduction system will not work until it is heated up again. Regeneration of particulate filters is interrupted and NO2-based regeneration of particulate filters will not work until it is heated up again. Several methods are known in the art to increase the exhaust gas temperatures under certain driving conditions, for instance by burning additional fuel for heating up the exhaust gas temperature. In WO 2008/015406 A1 use of an exhaust throttle valve is disclosed to increase the exhaust gas temperature.

WO 2007/032714 A1 discloses a method of maintaining a high temperature in the exhaust gas aftertreatment system. The method prevents the engine from pumping cold air to the exhaust gas aftertreatment system when the vehicle is coasting by recirculating an exhaust gas flow through an exhaust gas recirculation flow duct. It is suggested to employ an exhaust brake or a variable geometry turbine for braking the engine when the fuel supply is interrupted e.g. during coasting of the vehicle It is desirable to provide an improved method which allows to maintain an exhaust gas temperature at a level that ensures that the exhaust gas aftertreatment system can operate in an adequate temperature range. It is also desirable to provide a vehicle with an improved emission reduction.

A method is proposed for controlling an exhaust gas temperature of an engine of a vehicle during interruption of fuel supply to the engine, wherein the engine drives a driveline of the vehicle. Operation of the engine is alternating between two or more operational modes, wherein at least one of the operational modes maintains a higher exhaust temperature than the one or more other operational modes. Particularly, it is avoided to cool down components such as catalytic converters and/or particulate filters in the exhaust gas aftertreatment system when the engine does not generate enough heat.

Expediently, two different strategies can be used in the low torque area, i.e. during friction braking. In the first case the engine is moved to idle and the engine speed is changed to a lower speed. Here, using an automated mechanical transmission (AMT) is expedient. In the second case, exhaust gas recirculation can be used with unchanged engine speed. An automated mechanical transmission is not required in the latter case.

Favourably, the exhaust temperature can be established in a desired temperature range although the engine does not actively deliver heat by combustion. Catalytic converter and particulate filter can be stabilized in working temperature range. When the fuel supply is restarted, the components are ready for conversion of NOx and burning soot at once thus reducing the overall emissions of the vehicle. A heat up period for heating up the components with reduced exhaust cleaning efficiency can be avoided. It should be noted that a difference is between the temperatures of the exhaust gas aftertreatment system, particularly of catalytic converters and particulate filters, and the exhaust gas itself. According to an aspect of the invention the temperatures of these components can be maintained in a temperature range where the components are operable, i.e. where the selective reduction catalytic converter converts nitrogen oxides with sufficient efficiency and where regeneration of the particulate filter is possible. The rather large thermal masses of the catalytic converters makes them expensive and difficult to heat up at low average load on the engine.

According to a favourable method step according to an aspect of the invention, a frequency and/or a dwell time can be adjusted in at least one of the operational modes depending on a desired brake torque. Advantageously, the desired brake torque can be established even with operational modes with a lower brake torque than the desired one when alternating with operational modes with higher brake torque. Preferably, the desired braking torque can be created by alternating between motoring with EGR recirculation and a higher engine brake level. The motoring working point will not cool down the exhaust gas aftertreatment system due to extremely low mass flow. The higher engine brake level will have high enough temperature to not cool down the after treatment system. The result is an average temperature that is significantly higher than the low engine brake When the fuel supply to the engine is interrupted, the vehicle is decelerated by engine braking by using the energy-requiring compression phase of the engine to dissipate energy and slow down the vehicle. This braking mode is also called compression braking. Large trucks use also a device called an exhaust brake to increase the effectiveness of engine braking by help of an exhaust pressure governor (EPG). In non-hybrid vehicles engine braking is active regardless of the transmission type in the driveline and is activated when the foot is lifted off the accelerator, the transmission is not in neutral, the clutch is engaged and a freewheel is not engaged. This is also called engine drag. Active use of engine braking, i.e. shifting into a lower gear, is advantageous when the driver is desirous to control speed while driving down very steep and long slopes. It can be applied before regular disk or drum brakes are applied, leaving these brakes available to make emergency stops. The desired speed is maintained by using engine braking to counteract the acceleration due to gravity when driving downhill.

According to a favourable method step according to an aspect of the invention, particularly when an engine brake torque is required, engine braking operational mode generating a first brake torque can alternate with an operational mode with exhaust gas recirculation generating a lower brake torque than the first brake torque. The exhaust gas recirculation causes only a small gas flow flowing through the exhaust gas aftertreatment system thus keeping the temperature high and avoiding to cool the catalytic converters or particulate filter with cold gas flow. Particularly the first brake torque can be established during the engine braking operational mode to a value above a desired brake torque so that the desired brake torque is established as torque averaged over the two or more operational modes. The engine braking operational mode with a higher torque level than desired can be performed first before performing the operational mode with exhaust gas recirculation, so that the temperature of the exhaust gas system is still at a high level initially in the engine braking with a high brake torque phase before the exhaust recirculation keeps circulating warm exhaust in the engine. Residual heat can be stored in the catalytic converter and the particulate filter without an unwanted cooling gas flow.

According to a favourable method step according to an aspect of the invention, particularly during idling of the engine when virtually no brake torque is required, disengaging the engine from the driveline can be performed in one of the operational modes alternating with an engine compression brake operational mode for generating a brake torque. In this mode it can be avoided to pump cool air through the exhaust gas aftertreatment system. Residual heat can be kept in the gas aftertreatment system. Particularly, throttling an air flow to an intake manifold of the engine can be performed while the engine is disengaged from the driveline. Advantageously, a pressure in the inlet manifold of the engine can be reduced in a further development of an aspect of the invention. Favourably, the gas flow through the exhaust gas aftertreatment system can be reduced, so that the exhaust gas aftertreatment system is exposed only to small amounts of gas which might probably cool the system components.

According to another aspect of the invention, a vehicle is proposed in which an exhaust gas temperature of an engine is controllable by a method according to any method feature described above. Expediently, the vehicle shows lower emissions during normal driving operation and a lower fuel consumption as burning of additional fuel for heating up the exhaust gas aftertreatment system can be avoided.

BRIEF DESCRIPTION OF THE DRAWINGS

The present invention together with the above-mentioned and other objects and advantages may best be understood from the following detailed description of the embodiment(s), but not restricted to the embodiments, wherein is shown schematically.

DETAILED DESCRIPTION

Figure 1:
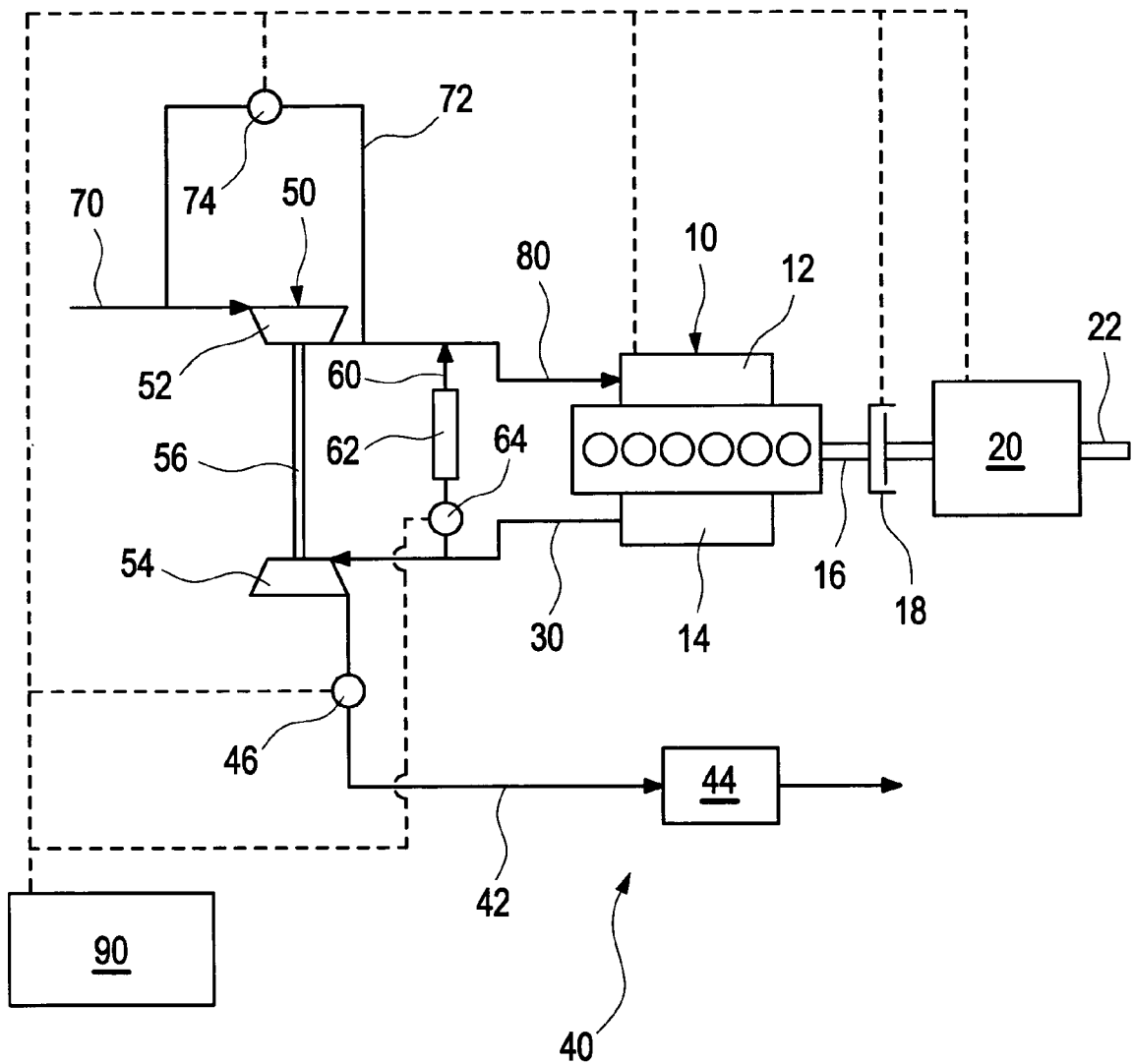
FIG. 1 an example embodiment of an exhaust gas aftertreatment system which is operated with a method according to an aspect of the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
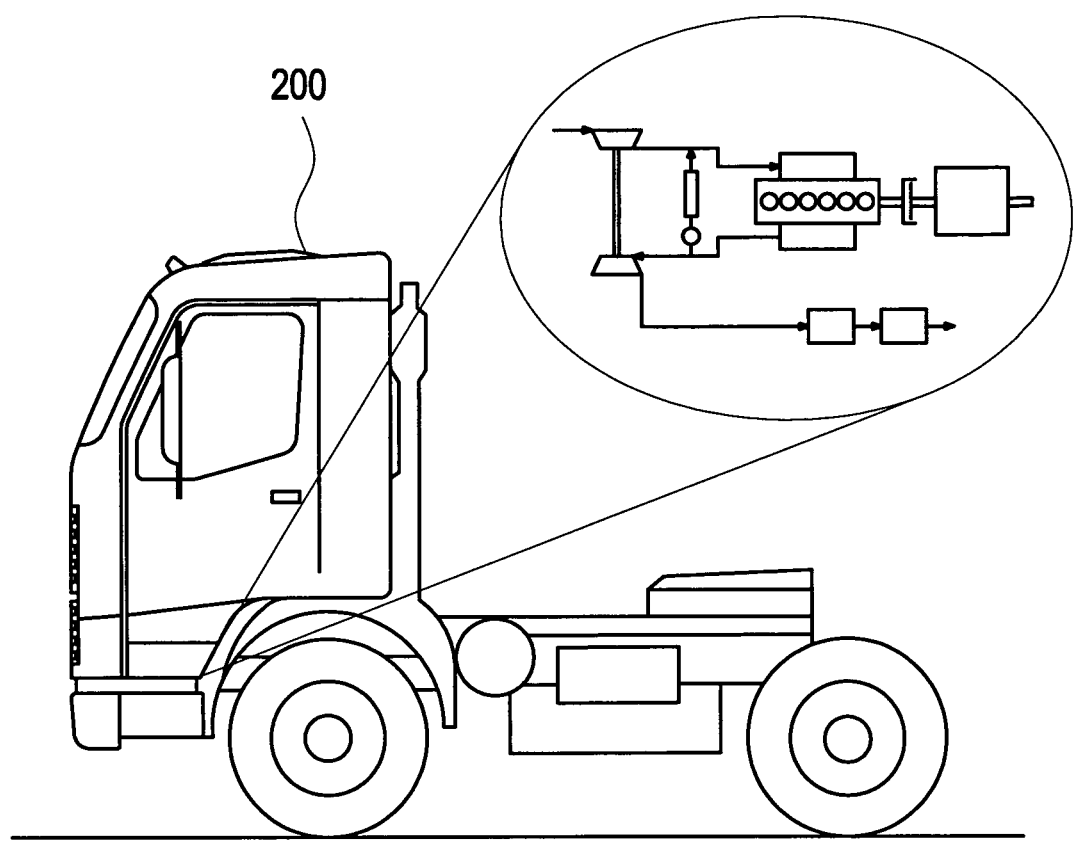
FIG. 2 a preferred vehicle according to an aspect of the invention.

FIG. 1 depicts schematically an example embodiment of an arrangement comprising a combustion engine 10 and an exhaust gas aftertreatment system 40 which is operated with a method according to the invention. FIG. 2 displays a vehicle 200 employing the method. The vehicle 200 is preferably a light, medium of heavy duty vehicle such as a truck.

The engine 10 comprises an intake manifold 12 for air compressed by a compressor 52 of a turbocharger 50 and fed via air pipe 80 and an exhaust manifold 14 for discharging exhaust gases to a turbine 54 of the turbocharger 50 via an exhaust pipe 30 and the exhaust gas aftertreatment system 40. The turbine 54 can drive the compressor 52 through a common axle 56.

A part of the exhaust gases can be recirculated from the exhaust manifold 14 to the intake manifold 12 by a recirculation pipe 60 comprising an exhaust gas cooler 62. The amount of recirculated exhaust gas can be adjusted by an exhaust gas recirculation valve 64 in the recirculation pipe 60 and an exhaust pressure governor valve 46 in an exhaust pipe 42 of the exhaust gas aftertreatment system 40.

Exhaust gas is cleaned in a converter section 44 comprising for instance a NOx catalytic converter such as a selective catalytic reduction (SCR) unit, particulate filter, oxidation catalytic converter and the like as generally known in the art.

The compressor 52 can be bypassed by a discharge recirculation valve 74 (DRV) arranged in a bypass pipe 72 so that air from an inlet pipe 70 upstream of the compressor 52 can at least partially bypass the compressor 52 thus reducing the pressure in the intake manifold 12.

The engine 10 drives a driveline 22 and is coupled to the driveline 22 via an output shaft 16 and a gearbox 20. Optionally, a clutch 18 can be provided between the engine 10 and the gear box 20. The engine 10 can be coupled to or decoupled from the driveline 22 by the gearbox 20 or the clutch 18.

A unit 90 can be provided for controlling the valves 46, 64, 74, optional clutch 18, gearbox 20 and fuel supply of engine 10. Favourably, the unit 90 can comprise units such as computer processors and memory on which the method according to the invention is implemented.

According to the invention, an exhaust gas temperature of the engine 10 is controlled during interruption of fuel supply to the engine 10. An interruption of fuel supply is triggered e.g. when the driver releases the gas pedal or another unit for requesting a torque from the engine 10 for propelling the vehicle.

When the fuel supply is stopped in a driving by alternating between a two or more operational modes, wherein at least one of the operational modes maintains a higher exhaust temperature than the one or more other operational modes.

Figure 3:
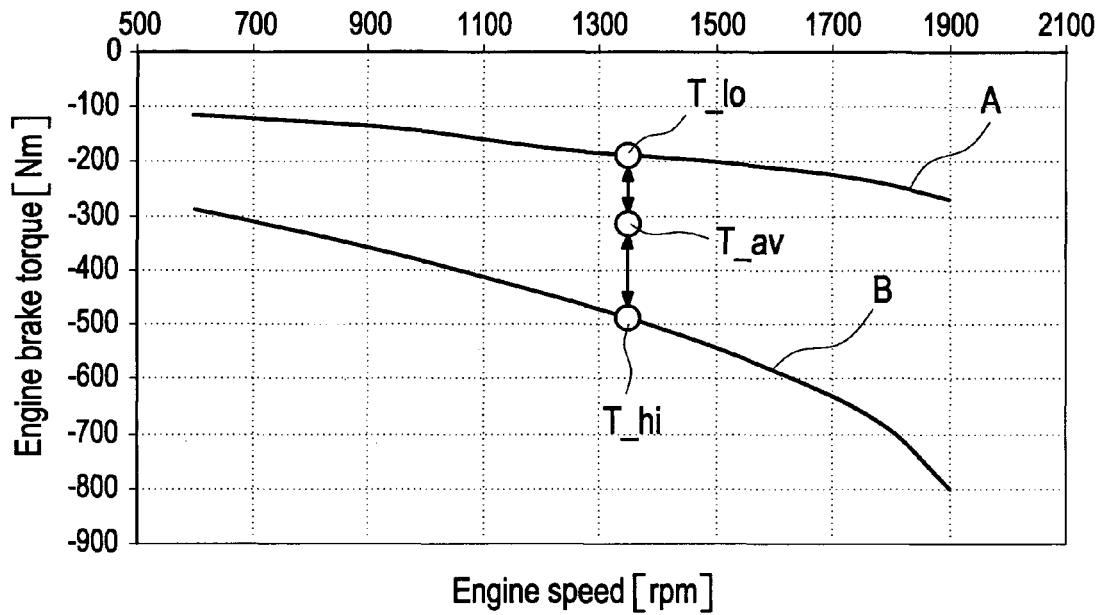
FIG. 3 graphs illustrating engine brake torques in different operational modes with high, low and average brake torque according to an aspect of the invention.

In a first variant indicated in FIG. 3, the method is alternating between an engine braking operational mode generating a first brake torque and an operational mode with exhaust gas recirculation generating a lower brake torque than the first brake torque.

FIG. 3 depicts torque graphs as a function of rotational speed illustrating engine brake torques in engine modes with high, low and average brake torque according to the invention.

Graph A illustrates a friction torque of the engine as a function of the rotational speed of the engine representing the brake power of the engine without fuel supply while the vehicle is moving, i.e. with friction braking of the engine. Graph B illustrates an example of a medium brake torque. A high brake torque denotes a high negative torque, for instance a torque in the range of −1500 Nm. A low brake torque denotes a low negative torque, for instance in the range of −200 Nm.

Generally, when speaking of engine braking a high brake torque refers to a high negative torque value.

When a first brake torque T_hi is established during the engine braking operational mode and a lower brake torque T_lo is established in a second operational mode, the result is an average torque T_av. If a certain torque value is desired, the brake torques T_hi and T_lo can be chosen to yield an average torque T_av equal to the desired torque.

The lower brake torque T_lo can be provided by an operational mode with exhaust gas recirculation as this can be regulated with a very low gas flow through the exhaust gas aftertreatment system and hence maintaining a high temperature in the exhaust gas aftertreatment system as virtually no cooling gas flow occurs. It is a favourable strategy for keeping the temperature in the exhaust gas aftertreatment system high while the engine is not generating higher negative or positive torque to minimize the cold air gas flow through the engine and the exhaust gas aftertreatment system. The exhaust gas temperature may not be very high when the engine torque is low. Typically, at friction torque the exhaust gas temperature is about 100° C. At higher engine brake torque, e.g. above 1000 Nm, particularly around 1500 Nm, the exhaust gas temperature is higher, e.g. between 200° C. and 400° C. and has little or no negative effect on the exhaust gas aftertreatment system concerning temperature.

During released throttle, i.e. fuel supply stopped with virtually pure engine friction braking, the exhaust gas temperature is very low and the mass flow through the exhaust gas aftertreatment system fairly high, while the brake torque T_hi is high. By alternating between the two operational modes with different torques T_hi, T_lo, the desire brake torque T_av can be established with a high enough temperature to keep by way of example the particulate filter and the selective reduction catalytic converter operative in the exhaust gas aftertreatment system.

Figure 4:
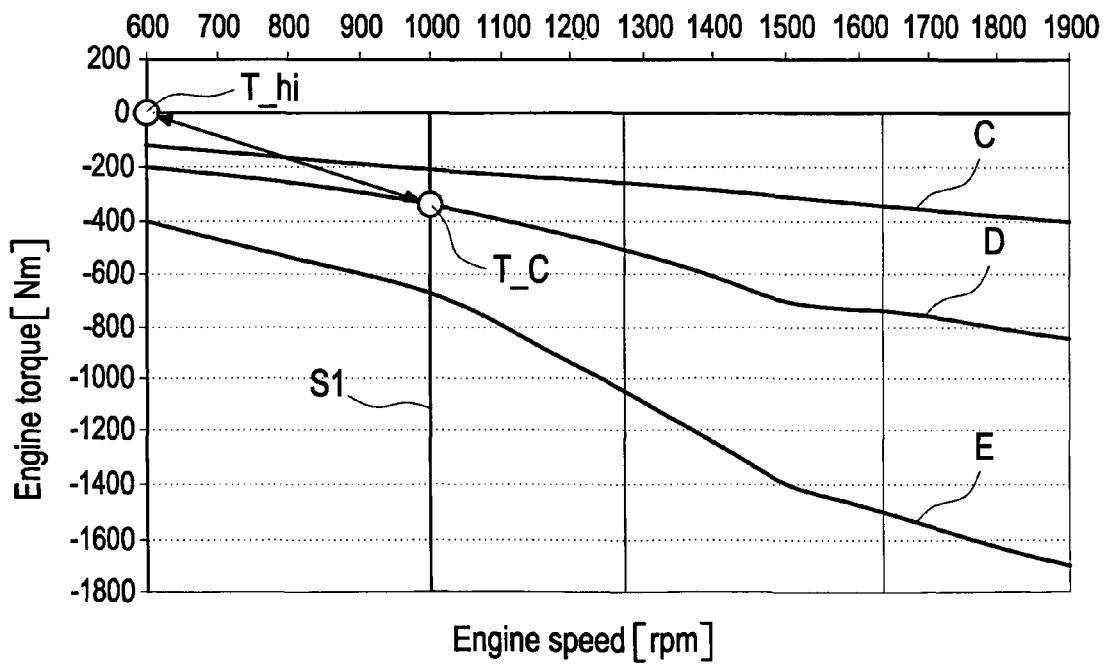
FIG. 4 graphs of an engine map for negative torques illustrating an exhaust temperature management during engine braking.
Figure 5:
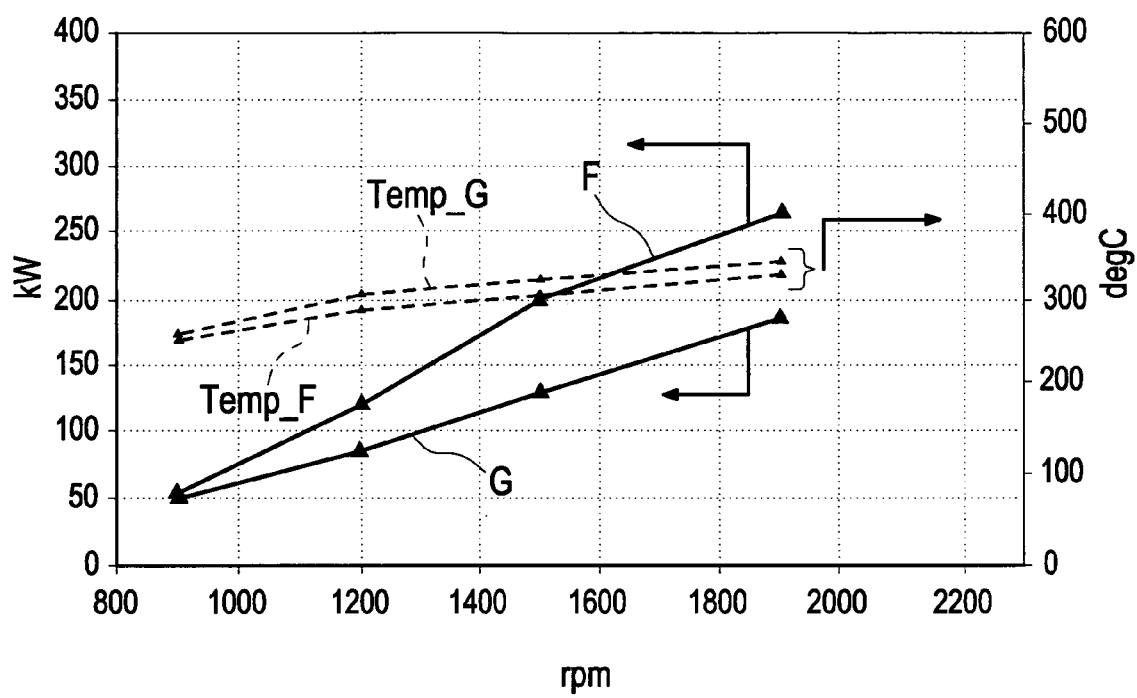
FIG. 5 graphs of torque control by a discharge recirculation valve illustrating a behaviour of brake power and exhaust gas temperature using discharge recirculation.

Alternatively or additionally to the above described embodiment of the method, in another variant the engine can be disengaged from the driveline in a first operational mode alternating with an engine compression brake operational mode for generating a brake torque. FIGS. 4 and 5 display graphs related to this variant, wherein FIG. 4 shows graphs of an engine map for negative torques illustrating an exhaust temperature management during engine braking and FIG. 4 shows graphs of torque control by a discharge recirculation valve illustrating a behaviour of brake power and exhaust gas temperature using discharge recirculation.

The dependency of the engine torque on the engine rotational speed is shown by graphs C, D, E of FIG. 4. S1, S2, S3 show constant engine speed at about 1000 rpm, 1300 rpm and 1600 rpm. Graph C depicts the brake torque by engine friction braking. The torque increases with increasing rotational speed. Graph E displays a brake torque with a maximum exhaust compression braking, which normally yields an exhaust temperature high enough for the maintaining the components in the exhaust gas aftertreatment system operative. Graph D shows a throttled exhaust compression braking. The point T_id at 600 rpm represents an idling engine with zero torque at e.g. 600 rpm.

During idling, it is difficult to maintain a high temperature in the exhaust gas aftertreatment system as a high gas flow cools the exhaust gas aftertreatment system. Expediently, the temperature can be increased to a certain level or maintained on a high level by using for example an air inlet throttle which also reduces the mass flow. This can be done for short or medium idling operational modes. A reasonable time for keeping the temperatures of the exhaust gas aftertreatment system with the help of an inlet throttle is in the order of minutes, for instance between 0-10 minutes. Particularly, the throttle may increase the exhaust gas temperature slightly but mainly reduces the mass flow through the exhaust gas aftertreatment system.

To avoid a pure friction mode during idling with cool and high exhaust gas flow the idling (or possibly shut off engine) operational mode can be alternated with a reduced exhaust compression braking operational mode, particularly on highest gear. This is exemplified by the torque T_C at 1000 rpm corresponding by way of example to 90 km/h. The temperature of the exhaust gas aftertreatment system can be maintained on a sufficiently high level for particulate filter and NOx catalytic converter operatable without providing a too high brake torque during idling. When idling, the engine can be decoupled from the driveline with the gear box in neutral position or at least freewheeling.

Another measure throttling an air flow to an intake manifold of the engine while the engine is disengaged from the driveline can also be applied instead of the exhaust compression braking, and/or a pressure in the inlet manifold of the engine can be reduced by using a discharge recirculation valve (DRV).

FIG. 5 shows a brake power and temperature of the exhaust gas when using the discharge recirculation valve. The brake power is now shown as positive numbers.

Graph F represents a baseline without activation of the discharge recirculation valve, Temp_F is the resulting temperature graph. The brake power increases strongly as a function of the rotational speed of the engine while the temperature of the exhaust gas varies between about 250° C. and 350° C.

With the discharge recirculation valve activated, the brake power is reduced from e.g. 250 kW at 1900 rpm (graph F) to below 200 kW as can be seen by graph G, whereas the temperature Temp_G is hardly changed in comparison to the deactivated discharge recirculation valve.

The invention claimed is:

1. A method for controlling an exhaust gas temperature of an engine of a vehicle during interruption of fuel supply to the engine, wherein the engine is adapted to drive a driveline of the vehicle, comprising interrupting fuel supply to the engine, and while the fuel is interrupted, alternating back and forth between at least a first operating mode and a second operating mode and thereby controlling exhaust gas temperature of the engine, wherein, in the first operating mode, the engine is disengaged from the driveline, and in the second operating mode, a brake torque is generated by engine compression braking.

2. The method according to claim 1, comprising adjusting a frequency and/or a dwell time in at least one of the operational modes depending on a desired brake torque.

3. The method according to claim 1, comprising throttling an air flow to an intake manifold of the engine while the engine is disengaged from the driveline.

4. The method according to claim 1, comprising reducing a pressure in the inlet manifold of the engine.

5. A vehicle in which an exhaust gas temperature of an engine is controllable by a method according to claim 1.

* * * * *